(12) United States Patent
Fattouch

(10) Patent No.: US 6,876,856 B2
(45) Date of Patent: Apr. 5, 2005

(54) METHOD FOR ESTABLISHING A RADIO COVERAGE MAP

(75) Inventor: Imad Fattouch, Paris (FR)

(73) Assignee: Societe Francaise Du Radiotelephone, Paris la Defense (FR)

( * ) Notice: Subject to any disclaimer, the term of this patent is extended or adjusted under 35 U.S.C. 154(b) by 412 days.

(21) Appl. No.: 10/215,352

(22) Filed: Aug. 9, 2002

(65) Prior Publication Data

US 2003/0040318 A1 Feb. 27, 2003

(30) Foreign Application Priority Data

Aug. 10, 2001 (FR) ............................................ 01 10724

(51) Int. Cl.$^7$ ................................................ H04Q 7/20
(52) U.S. Cl. .................... 455/446; 455/67.11
(58) Field of Search .............................. 455/67.11, 423, 455/446, 447, 424; 703/2, 22; 701/207, 208

(56) References Cited

U.S. PATENT DOCUMENTS

| | | | | |
|---|---|---|---|---|
| 5,561,841 A | * | 10/1996 | Markus | 455/446 |
| 5,987,328 A | * | 11/1999 | Ephremides et al. | 455/446 |
| 6,081,717 A | * | 6/2000 | Shah et al. | 455/446 |
| 6,097,956 A | | 8/2000 | Veeravalli et al. | |
| 6,336,035 B1 | * | 1/2002 | Somoza et al. | 455/446 |
| 6,499,006 B1 | * | 12/2002 | Rappaport et al. | 703/20 |

FOREIGN PATENT DOCUMENTS

| | | |
|---|---|---|
| EP | 1 098 546 A2 | 5/2001 |
| WO | WO 99/30522 A1 | 6/1999 |
| WO | WO 01/06349 A1 | 1/2001 |

* cited by examiner

*Primary Examiner*—Charles Appiah
(74) *Attorney, Agent, or Firm*—Lowe, Hauptman & Berner, LLP

(57) ABSTRACT

Method for establishing a radio coverage map of at least one cell for a cellular radio telephone network, by means of a calculation system using data memorized from a geographic map and the position of the cell and an associated radio base station, data memorized for a level of transmission for the station and a radio reception (S0) sensitivity threshold for handsets, and data memorized for a radio propagation attenuation law, a method in which the calculation system generates a grid of the cell map with a certain number (N1) of pixels on the map, calculates a number (N1) of attenuations of radio propagation for the level of transmission by the station for the respective pixels and a number of average reception levels (S1m), associated with respective pixels, which it memorizes, and compares them with the sensitivity threshold (S0) to determine a number of directions of disparity between the threshold value (S0) and the value of the average reception level (S1m) associated with each pixel, a method characterized by the fact that the data representing a temporal fluctuation law for the attenuation of radio propagation having been made available to the calculation system, the latter applies the fluctuation law to the number (N1) of average reception levels (S1m), it determines a corresponding number (N1) of probabilities (P, 311) so that the aforementioned respective disparities have a certain direction, and it establishes the radio coverage map by associating with each pixel the data representing the aforementioned probability (P, 311).

7 Claims, 3 Drawing Sheets

METHOD FOR ESTABLISHING A RADIO COVERAGE MAP

FIELD OF THE INVENTION

This invention relates to cellular radio telephone networks, and more particularly, when defining a network planned by an operator, to the provisional appraisal of the radio coverage for each of the cells, that is to say the efficacy of the provision of a communication service for mobile phones.

BACKGROUND OF THE INVENTION

A radio telephone network is made up of a number of terrestrial radio base stations, which provide radio coverage for zones defining the respective cells. To be able to establish communication between the mobile radio handsets in a cell and the station, the receiver circuits in these must receive signals above their sensitivity threshold.

The electronic noise from receiver circuit components adds to the radio propagation noise and may make the link unusable, for example, on a digital link, by causing incorrect detection of certain of the bits transmitted. Whatever the type of modulation used, the risk of errors in detecting bits rapidly increases when the level of useful signal received, and therefore the signal to noise ratio, descends to a threshold value only offering a minimal safety margin for noise interference.

Encrypting transmissions of data bit packets using redundancy, with a self-correcting code, enables the receiver to detect errors and to correct them if they are not too numerous. This enables an additional limited reduction in the level of reception to be tolerated, but beyond that, the number of excessive errors prevents any correction. Even if the logical link with the station can initially be established and maintained by service signals, to reserve a useful transmission path, the excessive rate of incorrect useful bits makes the latter unusable, for digitised voice and for other data.

In a general manner, the stations and the handsets must be equipped with highly sensitive receiver circuits, i.e. with a relatively low detection threshold, and powerful transmitter circuits.

For reception, the circuit components used are selected because they only generate a low level of intrinsic noise. It is possible therefore to amplify the useful signal received, until the level of intrinsic noise, amplified with the useful signal, starts to become disruptive. The sensitivity threshold for the receiver is reached. Distortions of radio propagation also represent a cause of errors, limiting the possibilities for detecting weak signals.

When transmitting, the power of the stations must remain limited, to prevent disruption between the cells and other radio systems. The transmission power of the handsets must also be limited, to maintain the autonomy of their batteries and to protect the health of users.

The operator can therefore not guarantee that all the handsets in a cell will receive a signal of a level at least equal to the sensitivity threshold to provide a radio link, in particular because of obstacles, such as walls in a building or the bodywork of a car carrying the user. The same applies in the other sense, to the station.

In practice, as the strength of the radio field decreases with distance, according to a recognised attenuation law, the size or "range" of the cells is limited to the distance for which the level of the field has markedly decreased to the sensitivity threshold for the handsets, with nevertheless a pre-determined safety margin to take account of temporary obstacles to radio propagation, causing a loss of signal.

The network operator also takes account of the contours of the cell and the type of environment, buildings, woods and other features, to correct the calculations of the field level performed using the attenuation law. Using these calculations, he determines the masked zones in the cell, i.e. the zones in which the level of reception of signals from the station is lower than the sensitivity threshold for the receivers.

In other words, and if each cell is divided into a grid of a number of pixels each representing an area of several tens or hundreds of square meters, the radio coverage map is made up of a mosaic of "black" or "white" pixels, depending on whether the field for the station is respectively higher or lower than the correct functioning threshold for handsets. The problem of the link to the station is less critical because this is balanced by parameterising the transmission conditions and the design of the network with the outgoing link.

The applicant has tackled the problem of the validity of such a binary approach for representing, as described above, or in another fashion, the coverage map for a radio telephone service.

He has observed that the above method for determining the existence of radio coverage does not take into account the dynamic aspects of radio propagation, i.e. changes in the latter over the course of time, and therefore alternating availability of a radio link and non-availability in the zone represented by each pixel, depending on fluctuations in the level received around the sensitivity threshold of the receivers.

OBJECTS AND SUMMARY OF THE INVENTION

This invention therefore aims to provide a method for establishing a radio coverage map for a cell, which better represents the reality.

To this effect, the invention relates to a method for establishing a radio coverage map of at least one cell for a cellular radio telephone network, by means of a calculation system using data previously memorised from a geographic map containing the position of the cell and an associated radio base station, using data previously memorised specifying a level of transmission for the station and a radio reception sensitivity threshold for handsets in the cell, and using data previously memorised for a radio propagation attenuation law, a method in which:

the calculation system generates, on the basis of the map data, a grid of the cell map with a certain number of pixels on the map occupying positions for which it memorises the representative data, it calculates, by comparison between the map data, specifying the position of the station, and the position data for each pixel and according to the attenuation law, a number of attenuations of radio propagation for the level of transmission by the station for the respective pixels from which it deduces, on the basis of the transmission level by the station, a number of average reception levels, associated with the respective pixels, which it memorises, and it compares the number of average reception levels memorised with the sensitivity threshold, to determine a number of directions of disparity between the threshold value and the value of the average reception level associated with each pixel, and deduces the radio coverage map for the cell.

a method characterised by the fact that the data representing a temporal fluctuation law for the attenuation of radio propagation having been previously memorised and made available to the calculation system, the latter applies the fluctuation law to the number of average reception levels, from this it determines a corresponding number of probabilities so that the aforementioned respective disparities have a certain direction, and it establishes a radio coverage map by associating with each pixel the data representing the aforementioned probability.

Therefore, and to re-use the pictorial representation of black and white pixels of the prior art, the invention proposes pixels of different shades of grey, i.e. a dynamic approach, which removes the distortions that exist between the reality and the binary, static evaluation of coverage.

A pixel whose "static" or "average" reception level, calculated according to the propagation law, is lower than the sensitivity threshold will thus be associated with a possible link probability, or local coverage rate, of between 0 and 50%, the latter corresponding approximately to the threshold. A white pixel in the prior art thus becomes light grey, and a black pixel becomes dark grey, because there is a probability of between 0 and 50% that the corresponding reception level may temporarily fall below the threshold.

The radio coverage for each pixel, established by the probability of exceeding the threshold or not, according to the attenuation law and the law governing fluctuation of reception levels, translates with perfect precision the influence of phenomena affecting radio propagation.

The disparity in question, and the associated probability, may indicate that the level received exceeds the threshold, and therefore expresses the fact that there is radio coverage, or may express the opposite, i.e. that there is no radio coverage. The two cases therefore correspond to the calculation by referring to the coverage or non-coverage percentages in opposite directions, radio coverage being, in both cases, perfectly and directly expressed by its value or its complement. Should the two levels be completely equal, this is a special case with no particular significance, which can be compared to either one or the other of the cases of disparity.

It is conceivable that the method according to this invention can be applied to several cells and, overall, to any geographic or administrative region.

More preferably, at least one other radio cell, with another base station, occupying a position enabling it to cover a border zone of the cell in question, the calculation system also determines the coverage map for the other cell and generates, in the pixels for the border zone, a composite disparity probability representing the composition of the probability associated with transmission from the station for the cell in question and an equivalent probability associated with transmission from the other station.

Thus, the modelling of the network is improved by taking into account an effect of mutual cooperation between cells, so well that the average estimated level of coverage in cells is increased. As the transmission level for the station is practically determined by the distance to the border zones, the fact of increasing, by composition, their probability of coverage does away with the need to increase the level of transmission from the station, which furthermore is not in the interest of zones close to the station. It is possible, if necessary, to reduce the planned level of transmission from the station, and therefore the disturbance to other cells, if the global intended radio coverage value for the cell is exceeded, or even to increase the size of the cell.

Preferably, with the map containing the population density data, the calculation system determines the population density for each pixel, and weights it with the probability associated with each pixel.

So, the coverage map represents a functional and commercial reality, i.e. the estimate of the percentage of customers with a radio service at a certain moment, and even the rate of functional availability of handsets. It is nevertheless understood that this is a question of average probabilities applicable to the whole of the population of handsets, and that the probability of availability of a certain handset depends on its position in the cell, and is especially weak at the edges of the latter.

With the aim of verifying a specification, for example, the calculation system can calculate all of the probabilities for the number of pixels to determine an average radio coverage rate for the cell. The calculation can relate to a purely geographic coverage map or to a population coverage map, and therefore to the weighted probabilities.

The invention will be better understood with the help of the following description of the preferred embodiment of the method according to the invention with a view to defining the cells for a cellular radio telephone network, with reference to the enclosed drawings.

DESCRIPTION OF THE PREFERRED EMBODIMENTS

Figure 1:
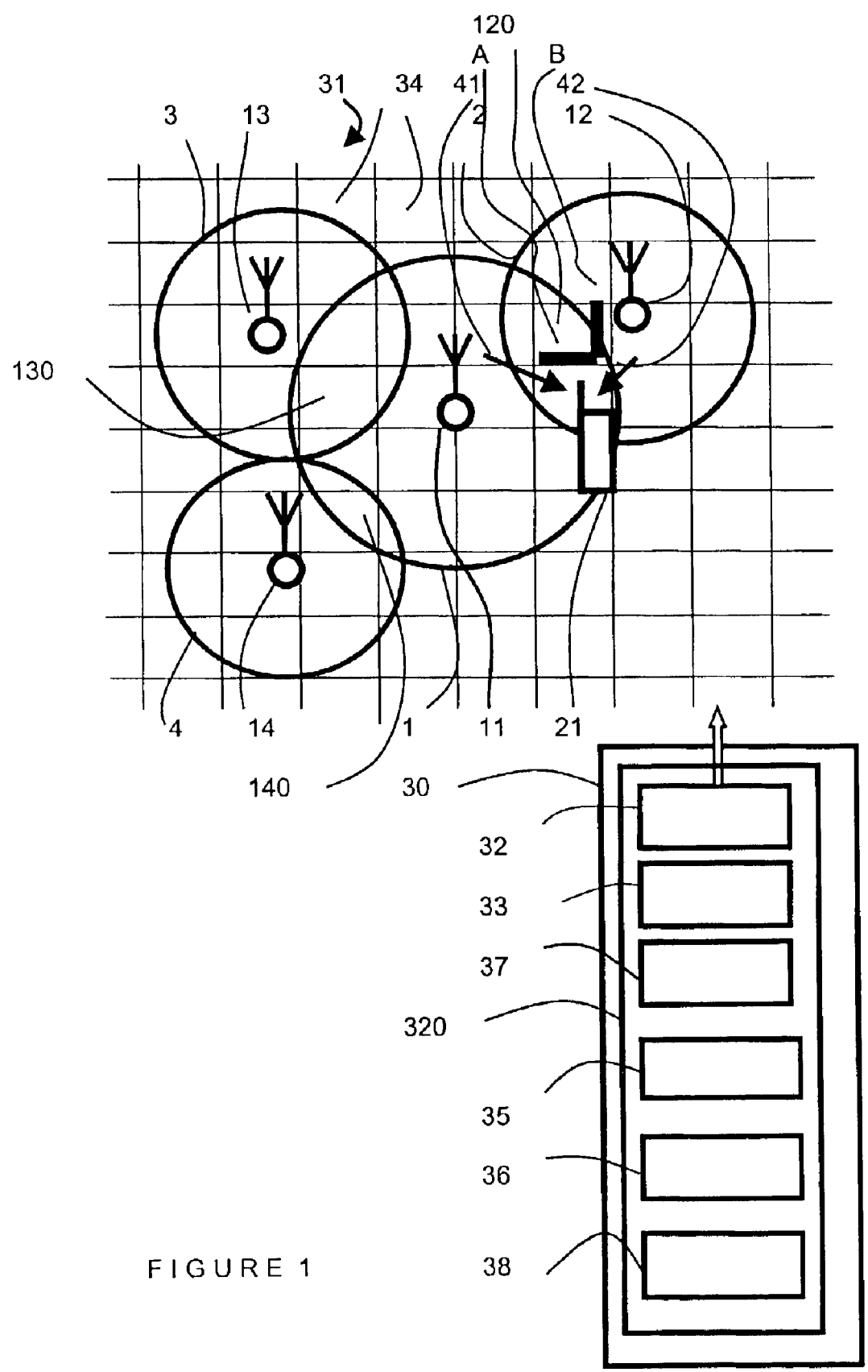
FIG. 1 is a diagrammatic representation of a geographic map showing a section of a cellular radio telephone network in the course of development.

FIG. 1 represents, on a mechanism for displaying a calculation system 30, a map 31 of a geographic zone for a cellular radio telephone system in the course of definition, on which have been recorded the intended positions of four radio cells, references 1, 2, 3 and 4 respectively, around base stations 11, 12, 13 and 14 respectively, in the positions indicated. As shown, cells 1 to 4 overlap each other, cell 1 containing border zones 120, 130 and 140 respectively, shared with cells 2, 3 and 4. As will be seen, coverage between cells 1 to 4 is a special case within the context of this invention.

Map 31 is a representation of data from a digital map (32) stored in a memory 32 of a database 320 containing various memories 32, 33 and 35 to 38 of the calculation system or calculator 30, whose calculation processing system, or central unit, for storage, entry and presentation of data, via a keyboard and/or an interactive display screen with a mouse or other device, has not been represented in detail. The digital map (32) specifies the natural and artificial contours, as well their nature, such as a forest, buildings or other objects, which enables an estimate to be made of the radio attenuation for links affected by these contours.

The operator of the network to be set up has a range of frequencies available to him and has defined and memorised in the calculator 30, a number of frequency values for boosters comprising digital transmission channels in this example, such as GSM or UMTS networks, which have been allocated to stations 11 to 14 respectively. The values of the frequencies allocated have been memorised in the database 320, and associated with the stations in question.

As shown by arrows 41 and 42, a mobile radio handset 21 situated in the border zone with coverage 120 can receive transmission from several stations, the two stations 11 and 12 in this case. From the two signals received (or more) the signal with the highest level is considered the useful signal, for example that from station 11, and the other one, from station 12, is a parasite signal, which can nevertheless become the useful signal if the radio propagation conditions reverse the disparity between the levels. If necessary, level management with hysterisis is also planned to limit the number of management hand-overs for the mobility of the handsets 21 between cells 1 to 4. Thus, a stronger signal losing its primacy in terms of level nevertheless remains considered the useful signal while the difference from the signal that has become the strongest does not exceed a certain value. So, in a general manner, the limits for cells 1 to 4 fluctuate with the radio propagation conditions.

A corresponding radio link evaluation can be estimated according to the relative positions of stations 11 to 14 in relation to the position of the mobile handset 21, which has been selected by the calculator 30, as the position of handset 21, i.e. a calculation of the transmission attenuation. This attenuation depends in particular on the distance between the transmitter in question and the receiving handset 21 and can easily be calculated for propagation in an open space in air, on the basis of a linear attenuation value of around 20 dB/km for the range of frequencies in question and for the first 500 meters, and 30 dB/km beyond that, or even 40 dB/km in an urban environment. If necessary, in the case of radio obstacles, information on the nature of the contours provided by the database 32 enables an estimate to be made of the link evaluation over a certain propagation trajectory.

The map 31 is divided into a number of adjacent grids or pixels 34, in this case each one representing a square with a 5 meter long sides, cell 1 containing N1 grids. The memorised map 31 therefore enabling the calculator 30 to calculate a provisional reception level S1$m$ for signals from station 11 to 14 at any point of the pixel 34, if their transmission level has been previously determined, and can then memorises the number of forecast reception levels, associated with the number of pixels 34, in a memory 38 of the database 320.

Reference 30 represents, in a general manner, a system for processing data whose central unit has access to the necessary data, contained in the database 320 (data (32) from the geographic map, attenuation law and others), these data having been memorised in the internal memory of the calculator 30 itself or being available in external memories, for example databases, which can be accessed via a data transmission network.

Having chosen the positions of stations 11 to 14 and their transmission strengths, and entered all this information into the memory 35, as well as the radio propagation attenuation law, saved in memory 33, and the corresponding data being available to the calculator 30, the latter can thus determine a reception level S1$m$ for signals from station 11 at any point of pixel 34 on the map 31, in cell 1, for example. Level S1$m$ is in fact an average reception level, as explained below. The calculator 30 also has, in a memory 36, a reception sensitivity threshold value S0 for the handset 21, i.e. a minimum level at which the rate of incorrect bits reaches the maximum permissible level. The calculator 30 can thus determine the difference between the reception level S1$m$ (transmission level from station 11 minus the link evaluation value) and the sensitivity threshold S0 (FIG. 2).

If the difference S1$m$–S0 is positive, reception will be guaranteed most of the time, and if not, it will be occasional at best.

As explained at the beginning, radio propagation depends on factors that change the link evaluation over time t. Thus, a mobile obstacle can arrive within the trajectory of the waves, and attenuate them, or on the other hand produce a reflection increasing the signal received by the handset 21, for example by "lighting up" a radio shadow zone. Such fluctuations have been studied and their statistical characteristics ascertained.

Figure 2:
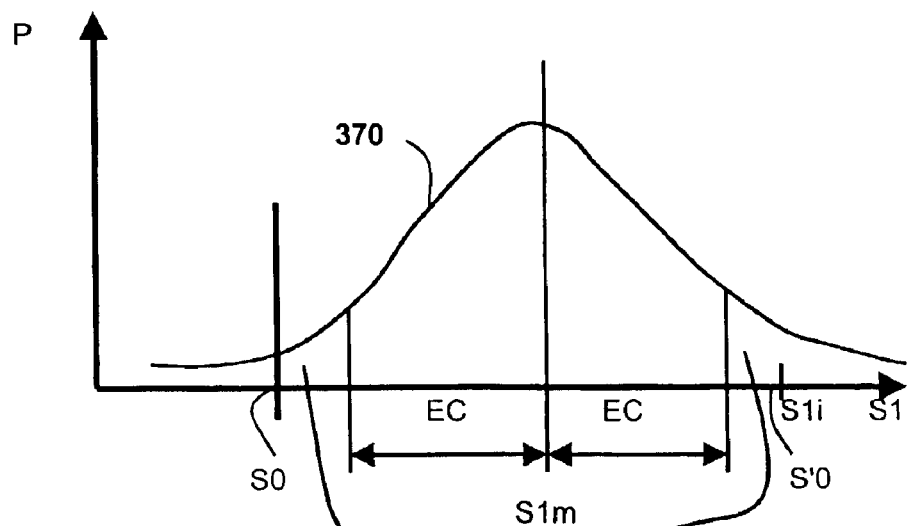
FIG. 2 represents a normal distribution showing a law of variation of the level of a radio signal received.

FIG. 2 represents a normal distribution illustrating a statistical fluctuation law 370 for the level of radio reception. The normal distribution represents the various probabilities P associated respectively with various reception levels S1$i$, taken from the X-axis S1, which differ from the average level S1$m$. In practice, this is a log-normal law. For example, the sum of the probabilities associated with levels differing by more than 1 standard deviation, EC, on the one hand is around 16%. In other words, the probability is 100–2×16= 68% for a momentary level not to differ by more than one standard deviation EC from the average value S1$m$ calculated by the link evaluation, clearly the most probable. It should be noted however that the invention is not limited to this specific law, which is likely to be changed by specific conditions, for example repeated occurrence of disruptive objects, obstacles or reflectors. In a general manner, it is sufficient for the calculator 30 to have in its memory 37 the law of variation or statistical fluctuation 370 to determine, according to the average reception level S1$m$, the probability that a momentary level S1$i$ would be either one side or the other of the sensitivity threshold S0. The curve in FIG. 2 therefore represents the line of the normal distribution for the law 370 in question, a line that is formed by the average calculated reception level S1$m$.

In FIG. 2, the sensitivity threshold S0 for the handset 21 has been given a fixed value, and we have (fictitiously) aligned the normal distribution with the X-axis, to position the top of the X-axis S1$m$ at the level determined by the link evaluation for the point in question in cell 1. The normal distribution 370 is thus divided into two sections, upper and lower, each representing the probability that the momentary signal is lower, or higher, than the sensitivity threshold S0. Therefore, if the average level received S1$m$ (top of the normal distribution) is, as it is here, higher than at least 1 standard deviation EC at the threshold S0, the probability of radio coverage is at least 84%, i.e. that the risk of a partial loss of negative amplitude exceeding 1 standard deviation EC is less than 16% at all times. As shown by the concave curve, turned in an upward direction, from the lower branch of the normal distribution, the probability of non-coverage decreases rapidly above 1 standard deviation EC.

The opposite is also represented, where the average level S1$m$ is presumed to be lower than the sensitivity level of the handset 21, with reference S'0. For the convenience of the diagram, the average level S1$m$ has been left alone and the threshold S0 has been raised to the level S'0. These two cases of disparity between the average level S1$m$ and the threshold S0 or S'0 are illustrated in FIG. 3.

Figure 3:
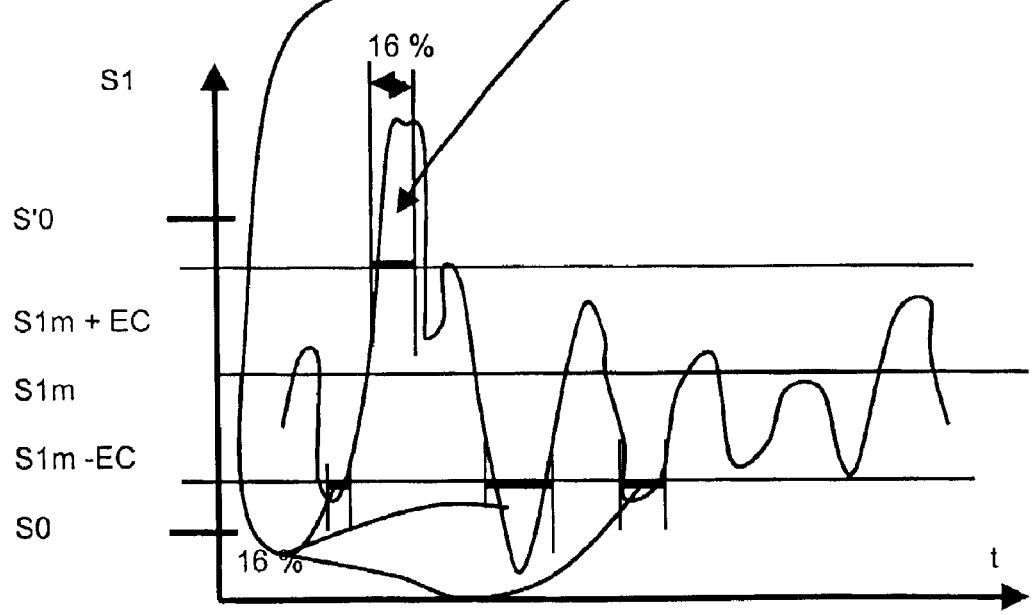
FIG. 3 represents fluctuations in the signal received, illustrating the normal distribution in FIG. 2.

FIG. 3 is an example of fluctuation in the received level S1. As suggested by the diagram, the two arrows leaving the two zones of the normal distribution situated outside the "heart" of the normal distribution, from S1$m$–EC to S1$m$+ EC in FIG. 2, the signal S1 remains statistically 16% of the time t below S1$m$–EC and 16% of the time above S1$m$+EC. We can therefore see that for an average signal received S1$m$ above the threshold S0 by at least 1 standard deviation EC, the probability that a negative parasite signal will reduce the momentary signal received below the threshold S0 is less than 16%. Symmetrically, if the average level received S1$m$ is lower than the threshold S'0 by at least 1 standard deviation EC, the probability that a positive parasite signal will reduce the momentary signal received below the threshold S'0 is less than 16%. As explained above, to make the diagram more simplistic, we have presumed two levels of threshold S0, S'0 by leaving the average level received S1$m$ unchanged, while it is actually the latter that varies with attenuation, the sensitivity threshold S0, S'0 remaining the same.

A detailed explanation of the probability calculations for radio coverage according to the safety margin for the average reception level S1$m$ can be found in the article "Microwave Mobile Communication" by Jakes Jr, John Wiley & Sons, New York, 1974.

The calculator 30 thus determines, for each of the number N1 of a matrix of points or pixels 34 on the map 31 representing the whole of cell 1, the average reception level S1$m$ for signals from station 11 and the fluctuations in the average level S1$m$ according to the statistical variation law in memory 37, from which it determines, by comparison with the sensitivity threshold S0, the probability that the momentary level S1$i$ is on a certain side of the threshold S0. Above the latter, at any time, there is radio coverage at the moment in question and below it, radio service cannot be guaranteed. As already indicated, the special case of equality, which is rare, has no particular significance and can be compared to either one or the other of the two principal cases.

So, in the method according to the invention, for establishing a radio coverage map for a cell 1 of a cellular radio telephone network, using the calculator 30 with data (32) previously memorised defining the geographic map 31 containing the position of cell 1 and an associated radio base station 11, with data (35, 36) previously memorised specifying the transmission level for the station 11 and the sensitivity threshold level for radio reception S0 for handsets 21 in cell 1, and with data previously memorised for an attenuation law for radio propagation (33).

the calculator 30 generates, on the basis of the map data (32), a grid of the map 31 for the cell 1 with a certain number N1 of pixels 34 on the map 31 occupying positions for which it memorises the representative data, it calculates, by comparison between the map data (32), specifying the position of the station 11, and the position data for each pixel 34 and according to the attenuation law (33), a number N1 of attenuations of radio propagation for the level of transmission (35) by the station 11 for the respective pixels 34 from which it deduces, on the basis of the transmission level (35) by the station 11, a number of average reception levels S1$m$, associated with the respective pixels 34, which it stores in memory 38, and it compares the number of average reception levels memorised S1$m$ with the sensitivity threshold S0, for the handsets 21 to determine a number N1 of directions of disparity between the threshold value S0 and the value of the average reception level S1$m$ associated with each pixel 34, and deduces the radio coverage map for the cell 1.

Furthermore, the data (37) representing a temporal fluctuation law for the attenuation of radio propagation having been previously memorised and made available to the calculator 30, the latter applies the fluctuation law to the number N1 of average reception levels S1$m$, from this it determines a corresponding number N1 of probabilities P (311, FIG. 4) so that the aforementioned respective disparities have a certain direction, and it establishes a radio coverage map by associating with each pixel 34 the data representing the aforementioned probability P (311).

It should be noted that the name "radio coverage map" basically denotes the data 311 indicating the probability of radio coverage for each pixel 34. This data may, if required, be represented in the form of a map, and/or be processed digitally to calculate an average coverage rate in the cell 1, by adding up the selective coverage rates for the respective pixels 34, the result being formed by dividing by N1. It should also be noted that the above calculations of the absolute level received S1 are equivalent to calculations for a relative level. In other words, the level of sensitivity S0 may be defined by its difference (maximum tolerated attenuation) from the transmission level of the station 11.

Traditional calculations, on the basis of a formula presented by Jakes to link the momentary probability of border coverage with the integrated global probability in cell 1, show that, if the standard deviation EC is for example 10 (or 8) dB, and if you consider that the limit for cell 1 is defined by a coverage rate of 50% (S1$m$–S0), the coverage probability for the cell 1 (supposedly the same level of radio propagation) is 75 (or 78)%. Conversely, if you start from an average target global radio coverage rate, for example 95% in the cell 1, the size must be limited or the strength of station 11 be increased so that the probability of maximum coverage for the cell 1 reaches 85 (or 80%). The comparison of the two examples above shows that a reduced standard deviation EC is favourable, in the sense that a probability of 80% at the border is sufficient to satisfy the average global target of 95%. In the case of a standard deviation EC of 10 dB, the probability value of 85% at the border leads to the inclusion of a margin (S1$m$–S0) of 11.3 dB.

It should be noted that the threshold S0 may vary depending on the radio service offered, increased speed in particular can raise this threshold. For example, in a third general UMTS system, for packets at an average useful speed of 384 kb/s, a level at the border S1$m$ of –86 dBm is recorded, including a margin of 12 dB. The threshold S0 is therefore –98 dBm.

The above method is of course applicable to the other cells 2 to 4, in a mutually independent manner. However, in addition, this document includes an improvement in the results of the method, consisting of taking into account a border effect, i.e. the fact that there is cooperation between stations 11 to 14. In effect, if we assume that the handset 21 is situated in a border zone 120 of cell 1 covered by, or simply next to, a border zone of an adjacent cell 2, there is a probability that a momentary reception level S2 for signals from the station 12 by the handset 21 is higher than the threshold S0. The handset 21 can then connect to station 12 if the link with station 11 demonstrates excessive weakening. It is conceivable however that the probability of cooperation is limited, or at the very least weak, because this is a question of links that are clearly at the full extent of their radio reception, therefore with a normal distribution summit where the position of the level associated with average reception S1$m$ is relatively close to the threshold S0, and provides only a very low safety margin.

In a similar case, the composite probability Pc of radio coverage of the pixel 34 in question is equal to $$Pc=A+B-A.B,$$

i.e. the sum of the two coverage probabilities for the pixel 34 in question, A and B (FIG. 1) associated with the respective stations 11 and 12, minus the value of the product A.B representing the fact that one of the two probabilities B (or A) is not useful when the other probability A (or B)is effective, i.e. when the link with station 11 (or 12) is functioning. For the purposes of illustration, in FIG. 1, the pixel 34 represented precisely by reference 120 includes a side outlined in heavy black, inside the pixel, along its whole length by a horizontal bar whose thickness is proportional to the probability A, and, in the same way, an adjacent perpendicular side outlined in heavy black, inside the pixel, along its whole length by a vertical bar whose thickness is proportional to the probability B. The composite probability PC is represented by the total heavy black area, which is therefore the sum of the two areas of the thick lines, less the covered area.

Other neighbouring stations 13 and 14 should also be taken into account to increase the calculated value of coverage rate for the pixel in a border zone.

So, at least one other radio cell 2,3 or 4 with a base station 12, 13 or 14 occupying a position enabling it to cover a border zone 120, 130 or 140 of the cell in question 1, the calculator 30 also determines the coverage map for each other cell 2, 3 or 4 and it allocates to pixels 34 of the border zone 120, 130 or 140 respectively the composite probability Pc of disparity representing the composition of the probability associated with the transmission from station 11 for the cell in question 1 and an equivalent probability associated with stations 12, 13 or 14 for the other cell 2, 3 or 4.

Figure 4:
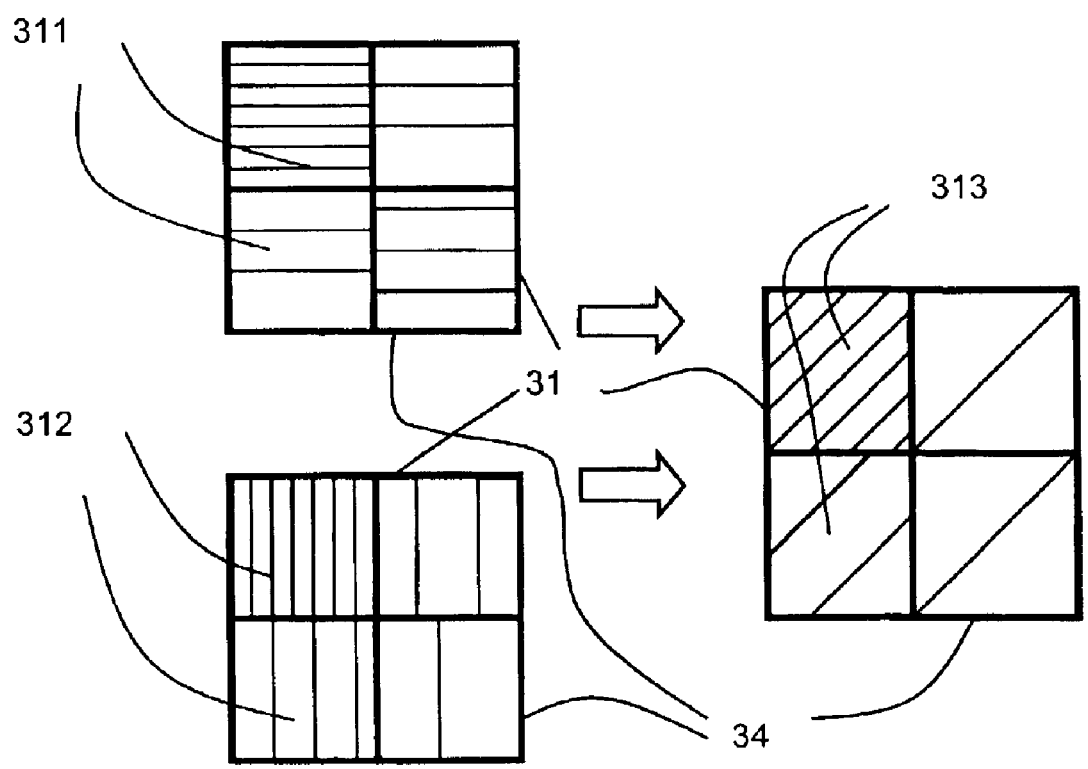
FIG. 4 illustrates the weighting of the geographic coverage map by a population density map.

FIG. 4 illustrate another feature of the method according to the invention, enabling a coverage rate for the intended population of handsets 21 in the cell 1 in question to be provided. The reference 311 on the map 31 represents the number N1 of various probabilities for coverage of the respective pixels 34, i.e. the geographic radio coverage map, here restricted to four pixels 34 for the clarity of the diagram. The reference 312, on the same map 31, designates the number N1 of various intended densities of handsets 21, or even the population density, possibly modulated to take account of the level of handsets 21 in the region of cell 1 in question. The reference 313 represents, again on map 31, the number N1 of various products of statistical density or probability of local radio coverage 311 by the density 312 of handsets 21 in the pixel 34 in question. In the calculator 30, each pixel 34 is associated with a piece of data, represented here by stripes that are more or less dense, or coloured, darker or lighter grey, stripes or others, representing the resulting product of composite density. This composite density can be expressed by a number effectively expressing a relative density between pixels 34 or by an absolute number if the pixels 34 are of different sizes. It should be understood that the corresponding map data 312 are available to the calculator 30, more preferably having been previously stored there, and that the latter performs the required multiplication or weighting calculations for each pixel 34 and then, if necessary, integrates the number N1 of results from the map 313 to provide an integrated value for forecast coverage of the estimated population of users, and therefore of handsets 21.

So, the map 31 containing the population density data (312), the calculator 30 determines the population density for each pixel 34 and weights the radio coverage for pixels 34 according to their respective population densities, to obtain the radio coverage map 313 for the population.

The reader will easily understand that the method according to the invention applies equally to a group of cells in a given zone (this zone being defined by a fictitious contour [arbitrary or simply commercial, administrative, etc. a county boundary for example]).

It should be evident, for people who are familiar with the art, that this invention permits embodiments in numerous other specific forms without leaving the area of application of the invention as claimed. As a result, the present embodiments should be considered as illustrations but can be changed within the area defined by the scope of the attached claims.

What is claimed is:

1. Method for establishing a radio coverage map of at least one cell for a cellular radio telephone network, by using a calculation system using data previously memorized from a geographic map containing the position of the cell and an associated radio base station, using data previously memorized specifying a level of transmission for the station and a radio reception (S0) sensitivity threshold for handsets in the cell, and using data previously memorized for a radio propagation attenuation law, the method comprising:

activating the calculation system to (a) generate, on the basis of the map data, a grid of the cell map with a certain number (N1) of pixels on the map occupying positions, (b) memorize the representative data, (c) calculate a number (N1) of attenuations of radio propagation for the level of transmission by the station for the respective pixels by comparison between the map data, specifying the position of the station and the position data for each pixel and according to the attenuation law, (d) deduce, on the basis of the transmission level by the station a number of average reception levels (S1$m$) associated with the respective pixels, (e) memorize the number of average reception levels (S1$m$) associated with the respective pixels, (f) compare the number of average reception levels (S1$m$) memorized with the sensitivity threshold (S0) to determine a number of directions of disparity between the threshold value (S0) and the value of the average reception level (S1$m$) associated with each pixel, (g) deduce the radio coverage map for the cell, supplying data representing a temporal fluctuation law for the attenuation of radio propagation to the calculation system, causing the calculation system to: (a) apply a fluctuation law to the number (N1) of average reception levels (S1$m$), (b) determine a corresponding number (N1) of probabilities so that the aforementioned respective disparities have a certain direction in response to the result of the fluctuation law being applied, and (c) establish a radio coverage map by associating with each pixel the data representing the aforementioned probability.

2. A method according to claim 1 wherein the method is performed with at least one other radio cell having another base station occupying a position enabling the active cell to cover a border zone of the cell in question, the calculation system also determining the coverage map for each other cell and generating in the pixels for the respective border zone a composite disparity probability (Pc) representing the composition of the probability (A) associated with transmission from the station for the cell in question and an equivalent probability (B) associated with transmission from the other station.

3. A method according to claim 2 wherein the map includes population density data, activating the calculator to determine the population density for each pixel and weight it by the probability associated with each pixel.

4. A method according to claim 3 wherein the calculation system calculates the sum of the probabilities (P) for the number of pixels to determine an average radio coverage rate for the cell.

5. A method according to claim 4 in which the calculation relates to the sum of the weighted probabilities.

6. A method according to claim 1 wherein the map includes population density data, activating the calculator to determine the population density for each pixel and weight it by the probability associated with each pixel.

7. A method according to claim 1 wherein the calculation system calculates the sum of the probabilities (P) for the number of pixels to determine an average radio coverage rate for the cell.

* * * * *